United States Patent [19]

Pollard et al.

[11] Patent Number: 5,171,183

[45] Date of Patent: Dec. 15, 1992

[54] DISK DRIVE COOLING SYSTEM BRACKET

[75] Inventors: Christopher A. Pollard, Monument; Ivan H. Hults, Jr., Boulder, both of Colo.

[73] Assignee: Sony Corporation, Park Ridge, N.J.

[21] Appl. No.: 796,398

[22] Filed: Nov. 22, 1991

[51] Int. Cl.⁵ ............................................. H05K 7/20
[52] U.S. Cl. ................................... 454/184; 361/384
[58] Field of Search ......................... 454/184; 361/384

[56] References Cited

U.S. PATENT DOCUMENTS

| | | | |
|---|---|---|---|
| 3,039,377 | 6/1962 | Wernli | 454/184 |
| 4,702,154 | 10/1987 | Dodson | 454/184 |
| 5,079,438 | 1/1992 | Heung | 361/384 X |

*Primary Examiner*—Robert G. Nilson
*Attorney, Agent, or Firm*—Limbach & Limbach

[57] ABSTRACT

A mounting bracket for installing an optical disk drive into the 5.25 form factor disk drive slot of a microcomputer enclosure includes a dedicated air filtration system which produces a positive pressure flow of cooling air within the disk drive.

15 Claims, 2 Drawing Sheets

DISK DRIVE COOLING SYSTEM BRACKET

BACKGROUND

1. Field of the Invention

The present invention relates to microcomputers and their associated peripheral devices, and more particularly, to a bracket for mounting a disk drive or other peripheral device into a standard sized slot of a microcomputer enclosure and to means for providing filtered cooling air to the disk drive or other peripheral device.

2. Discussion of the Prior Art

A typical microcomputer system, such as a personal computer (PC), is available as a self-contained unit to which peripheral devices, such as a keyboard, a video display, and a memory, among others, can be connected. A common PC enclosure has 5.25 inch form factor slots (5.75 inches wide by 3.25 inches high) in the face of the enclosure into which a standard memory device, e.g., a disk drive, can be installed. The installed disk drive can be powered from the PC power supply, and the disk drive communicates with the PC via a cable which is connected to a controller inside the PC enclosure.

It has become common to produce "half-height" disk drives so that a pair of drives can be stacked into a single slot. A standard half-height device has a 5.25 inch form factor (5.75 inches wide by 1.625 inches high) and fits snugly into the standard 5.25 inch form factor slot.

The proliferation of 3.5 inch format disks, particularly for optical storage, has led to the need for incorporating smaller disk drives into a standard PC slot. A standard 3.5 inch half-height disk drive has a 3.5 inch form factor (4 inches wide by 1.625 inches high), but can be inserted into a 5.25 inch form factor slot by providing a mounting bracket with the drive to adapt to the sizing of the slot.

As with all electronic circuit devices, the PC and installed disk drive require cooling air to keep the operating temperature at moderate levels. Thus, the PC typically has an internally mounted cooling fan to draw unfiltered outside air into the enclosure, and to expel hot air from the enclosure.

Optical disk drives, such as the Sony model D-301, are available which can be inserted into the 5.25 inch form factor PC slots. However, optical disk drives are far more sensitive to dust and heat than other types of disk drives. The ambient cooling scheme of the PC fan exacerbates the dust problem by creating a negative pressure within the disk drive mounted in the PC enclosure, with the result that dust is sucked into the optical disk insertion opening of the disk drive. Therefore, optical disk drives are more commonly used as stand-alone devices which include a cooling system that provides filtered air to the optical drive electronics. For example, the Sony model S-301 is no more than the Sony model D-301 placed in a box and provided with a power supply, a controller for communication with the SCSI interface in the PC, and an air filtration system. The filtration system is simply a fan which draws outside air through a filter element before forcing the filtered air over the optical drive electronics. This arrangement is more expensive to the consumer since an additional controller card is required in the stand-alone unit. Furthermore, more space is required for a stand alone disk drive.

Thus, it would be desirable to adapt a standard optical disk drive unit for mounting in a PC to include a dedicated air filtration system.

SUMMARY OF THE INVENTION

The above and other problems of PC mounted peripheral devices such as optical disk drives are overcome by the present invention of a mounting bracket for installing a peripheral device, such as an optical disk drive into a standard sized slot of a microcomputer enclosure. The bracket includes an air filtration system which is dedicated to the optical disk drive and which creates a positive air pressure within the optical disk drive. Preferably, the bracket is dimensioned to accommodate a 3.5 inch form factor optical disk drive and includes three sides separately affixed to the left side, the rear side, and the right side of the drive. The bracket is identical in height with the drive. One of the left or right sides of the bracket includes an air duct with a filter at one end, i.e., at the front of the optical disk drive, and a fan at the other end for supplying external, filtered cooling air to the optical disk drive electronics and thereby creating a positive air pressure within the optical disk drive which helps exclude dust.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE PREFERRED EMBODIMENT

Figure 1:
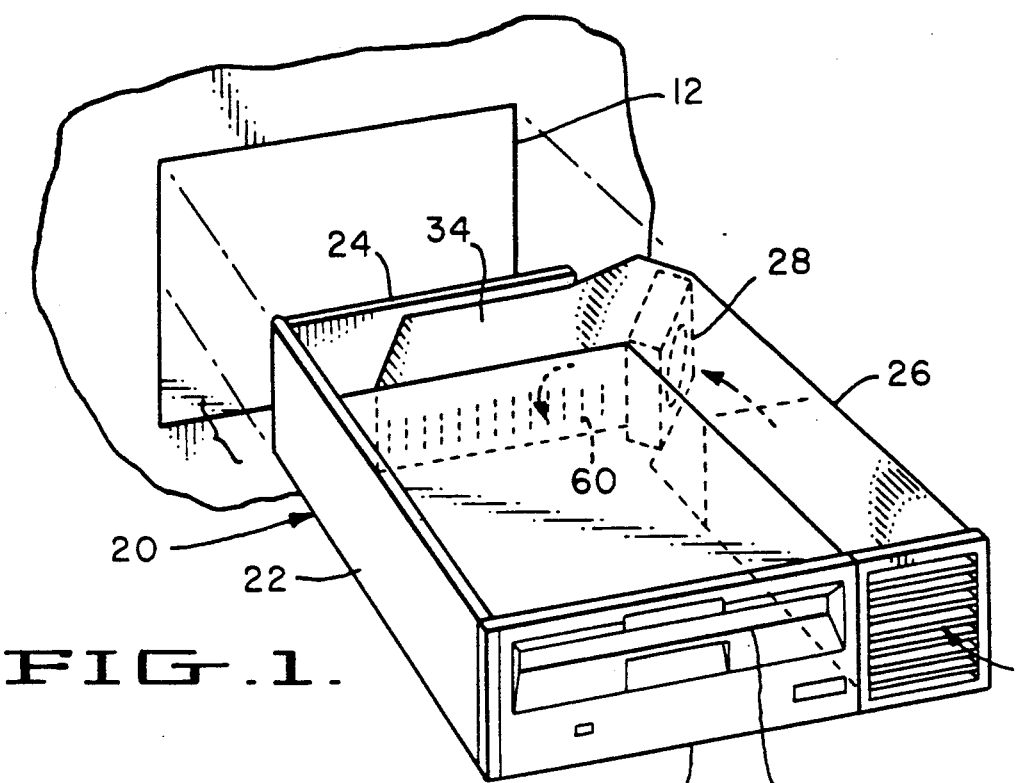
FIG. 1 is a perspective view of an optical disk drive system mounted in a disk drive cooling system bracket in accordance with the present invention.
Figure 2:
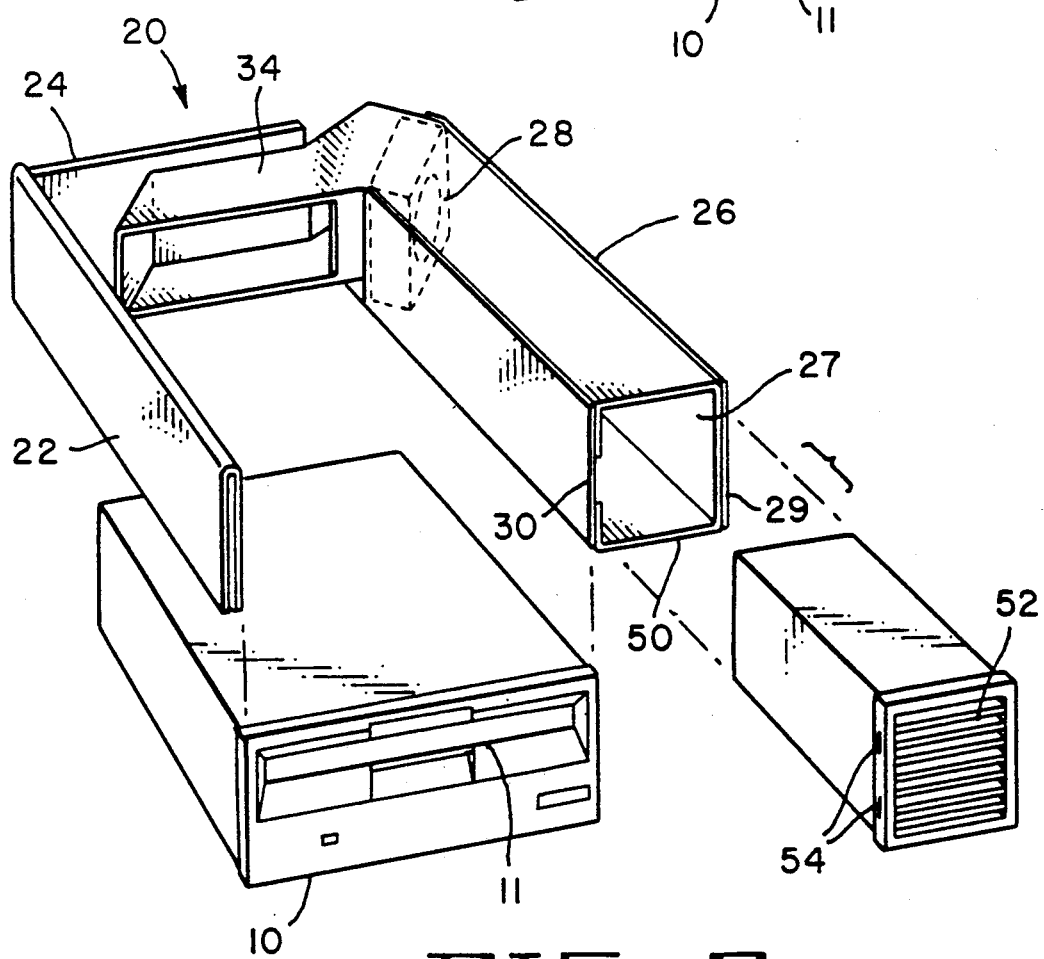
FIG. 2 is an exploded, perspective view of the system of FIG. 1, separately showing the disk drive, air filter and bracket.

Referring now to FIGS. 1 and 2, an optical disk drive 10 is mounted into the top half of a PC slot 12 utilizing the bracket 20 of the present invention. The optical disk drive 10 is a standard half-height drive having a 3.5 inch form factor, i.e., the drive measures 4 inches wide by 1.625 inches high. An example of such a drive is the Sony model D-301. The slot 12 is a 5.25 inch form factor slot, i.e., measuring 5.75 inches wide by 3.25 inches high, such that two half-height drives could be inserted, one on top of the other, into the slot.

The bracket 20 is designed to adapt a 3.5 inch form factor half-height device, such as the Sony model D-301 optical disk drive 10, to fit into a 5.25 inch form factor slot 12, and also to provide dedicated air cooling to the electronics of the optical drive 10. Since the Sony model D-301 is fully 1.625 inches high, i.e., it takes up all the height allocated for a half-height device, the bracket 20 must not extend above or below the top or bottom, respectively, of the optical drive 10. Thus, the bracket 20 is designed to wrap around the optical drive on three sides (left side 22, rear side 24, and right side 26) as shown.

Figure 3:
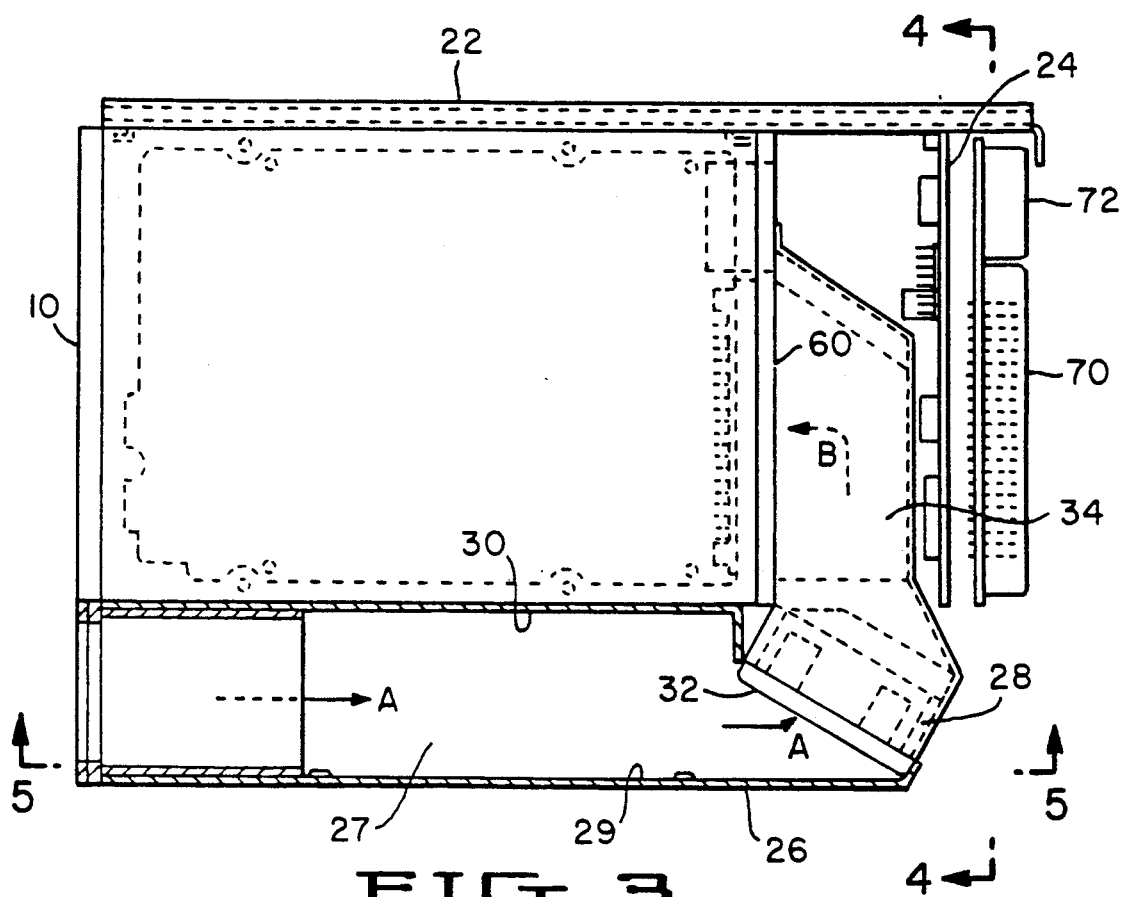
FIG. 3 is a plan view of the system of FIG. 1.
Figure 4:
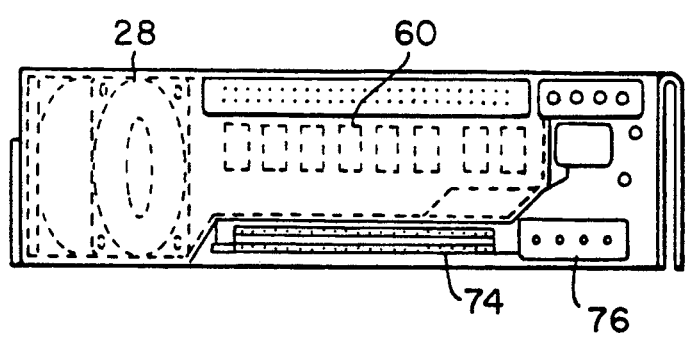
FIG. 4 is a rear elevational view of the system of FIG. 1.
Figure 5:
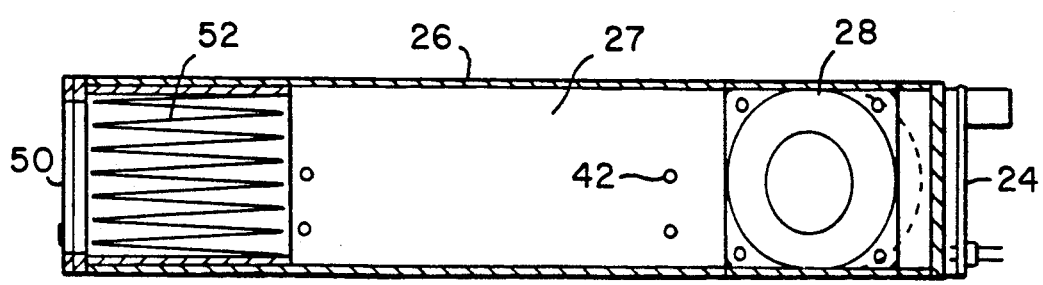
FIG. 5 is vertical, sectional view taken generally along the lines 5—5 of FIG. 3.

More specific details of the bracket construction and mounting are shown in FIGS. 3-5. The left side 22 of the bracket 20 is a simple U-channel piece of sheet metal which is affixed by screws to the left side of disk drive 10 and mounts the drive onto a corresponding bracket (not shown) in the PC slot 12. The left side 22 of the bracket 20 is 8 inches long, extending beyond the rear of the disk drive 10 where it attaches by screws to the rear 24 of the bracket 20, the rear side 24 also being formed from sheet metal. The disk drive 10 is mounted within the PC slot 12 solely by the left side U-channel bracket 22. The rear side 24 measures 5.75 inches wide by 1.66 inches high.

The right side 26 of the bracket 20 includes an air duct 27 through which outside air is drawn by fan 28. The air duct 27 is also formed from sheet metal, and measures 1.66 inches high by 1.75 inches wide by 8 inches long. The air duct 27 includes spot welded reinforcing plates 29 and 30 on either side of the duct 27. The outer reinforcing plate 29 is 8 inches long by 1.66 inches high, and the inner reinforcing plate 30 is 5.75 inches long by 1.66 inches high.

At the rear of the air duct 27, i.e., at the corner formed between the right side 26 and the rear side 24, is an opening 32 into which an angled fan 28 can be mounted by screws or the like for drawing outside air through the duct in the direction indicated by arrows A. The fan 28 is mounted within duct 27 at approximately a thirty degree angle relative to the axis of the main portion of the duct 27.

The left side 22, plate 29 and plate 30 are each provided with a pair of holes 42 for mounting the bracket 20 onto the drive 10. Also, access holes (not shown) are provided in the left side 22 for mounting it to the PC.

An opening 50 in the front face of the air duct 27 has a filter element 52 which is inserted into the duct 27. The filter element 52 is preferably snapped into place by a set of clips 54 around the periphery of the filter, such that the filter 52 can be conveniently replaced as may be necessary.

As best shown in FIG. 3, the rear side 24 is provided with a plenum chamber 34 which conducts air output from the fan 20 to a series of vents 60 in the rear of drive 10. The fan 28 positively forces air through the vents 60, as shown by arrow B, to cool the electronics inside the optical drive 10 and create a positive air pressure within the optical disk drive 10. The cooling air escapes through the optical disk insertion opening 11 in the front of the optical disk drive 10, thereby ensuring a dust free environment within the drive 10. Some of the cooling air is also leaked out of the drive 10 to cool the power supply, etc., not shown.

The rear side 24 does not fully cover the rear of the disk drive 10, so that open access is provided underneath the rear side 24 to allow an interface card 70 and a power cable 72 to insert directly into electrical connectors 74 and 76, respectively, on disk drive 10. The fan 28 can also take its power from the cable 72.

It should be understood that the invention is not intended to be limited by the specifics of the above-described embodiment, but rather defined by the accompanying claims.

We claim:

1. A mounting bracket for both mounting a peripheral device in a disk drive slot of a personal computer and providing a separately filtered supply of cooling air to the peripheral device, comprising:

a) a frame insertable into the slot, the frame being dimensioned to contain and support the peripheral device;
   b) an air duct attached to the frame and having a first opening on one end and a second opening on the other end of the air duct;
   c) means for connecting the second opening with the interior of the peripheral device;
   d) a filter element in the air duct; and
   e) a fan coupled to the air duct near the second opening for drawing outside air through the first opening and the filter element into the air duct, and then directing the air through the second opening to the interior of the peripheral device.

2. The mounting bracket of claim 1, wherein the frame comprises a right side member, a rear member having one end thereof connected generally at right angles to an end of the right side member, and a left side member having one end thereof connected generally at right angles to the other end of the rear member, so as to encompass the left, rear and right sides of the peripheral device.

3. The mounting bracket of claim 2, wherein the air duct is attached to one of the right side member or left side member.

4. The apparatus of claim 1, wherein the slot is a 5.25 inch form factor slot.

5. The apparatus of claim 4, wherein the peripheral device is a 3.5 inch form factor optical disk drive.

6. An apparatus for mounting a peripheral device into a slot in a microcomputer enclosure and for providing filtered cooling air to the peripheral device, comprising a bracket dimensioned for receiving the device and for fitting snugly into the slot when the device is mounted within the bracket, wherein the bracket defines an air duct having a first opening adjacent to a front portion of the bracket and a second opening adjacent to a rear portion of the bracket and further including means for drawing air through the air duct and supplying it to the rear of the peripheral device.

7. The apparatus of claim 6, wherein the slot is a 5.25 inch form factor slot.

8. The apparatus of claim 7, wherein the peripheral device is a 3.5 inch form factor device.

9. The apparatus of claim 6, wherein the bracket also includes:

a) a removable filter element positioned in the air duct; and
   b) the means for drawing air includes a fan coupled to the air duct near the second opening, wherein the fan draws outside air through the first opening into the air duct, through the filter element, and then directs the air through the second opening and into the peripheral device.

10. An assembly capable of being mounted into a 5.25 inch form factor slot in a microcomputer enclosure, comprising:

a) a 3.5 inch form factor peripheral device;
   b) a three-sided bracket attached to the peripheral device and dimensioned to fit snugly into the slot, including:
      i) an air duct affixed to one side of the bracket and having a first opening adjacent to the front of the peripheral device and a second opening adjacent to the rear of the peripheral device and in communication with the interior of the peripheral device;

ii) a removable filter element inserted into the first opening; and iii) a fan coupled to the second opening for drawing outside air through the first opening and the filter element into the duct, and then directing the air through the second opening and into the peripheral device.

11. The assembly of claim 10, wherein the peripheral device includes an air vent in the rear of the device, and wherein the fan directs air into the air vent to cool electronic circuitry which resides in the device.

12. An air filter assembly capable of being mounted on a 3.5 inch form factor peripheral device designed to fit into a 5.25 inch form factor slot in a microcomputer enclosure, comprising:
   a) an air duct having a first opening proximate to the front of the peripheral device and a second opening proximate to the rear of the peripheral device;
   b) a removable dust filter element mounted in the first opening; and
   c) a fan mounted within the air duct proximate to the second opening for drawing outside air through the dust filter element and the first opening into the duct, and then directing the air through the second opening and into the peripheral device.

13. The air filter assembly of claim 12, wherein the air duct is adapted to be mounted on one side of the peripheral device.

14. The air filter assembly of claim 13, wherein the air duct comprises:
   a) a first straight portion extending axially from the first opening;
   b) a transition portion extending from the first straight portion distally of the first opening at an acute angle relative to the axis of the first straight portion; and
   c) a second straight portion extending from the transition portion and perpendicular to the first straight portion;
   d) wherein the fan is mounted within the transition portion.

15. The air filter assembly of claim 14, wherein the acute angle formed by the transition portion and the first straight portion is approximately thirty degrees.

* * * * *